(12) United States Patent  
Plantan et al.

(10) Patent No.: US 8,161,614 B2
(45) Date of Patent: Apr. 24, 2012

(54) AIR DISK BRAKE CALIPER PRE-STRESSING METHOD AND PRE-STRESSED CALIPER APPARATUS

(75) Inventors: Ronald S. Plantan, Elyria, OH (US); Richard Lee Lantz, Jr., Clinton, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 474 days.

(21) Appl. No.: 12/408,321

(22) Filed: Mar. 20, 2009

(65) Prior Publication Data

US 2010/0236875 A1     Sep. 23, 2010

(51) Int. Cl.
*B23Q 17/00* (2006.01)
*F16D 55/00* (2006.01)

(52) U.S. Cl. .................... 29/407.05; 188/71.1

(58) Field of Classification Search ......... 29/407.01, 29/407.05, 407.08, 428, 446; 188/71.1; 73/760; 702/42

See application file for complete search history.

(56) References Cited

U.S. PATENT DOCUMENTS

| | | | |
|---|---|---|---|
| 3,887,045 A | 6/1975 | DeHoff et al. | |
| 4,248,191 A | 2/1981 | Albert | |
| 4,331,222 A | 5/1982 | Liston et al. | |
| 4,372,152 A | 2/1983 | Lewis et al. | |
| 4,999,959 A | 3/1991 | Virtanen | |
| 5,193,375 A | 3/1993 | Meister | |
| 5,716,466 A | 2/1998 | Yamaoka et al. | |
| 5,841,033 A | 11/1998 | Burris et al. | |
| 2008/0081208 A1 | 4/2008 | Prevey et al. | |
| 2008/0158353 A1 | 7/2008 | McKinley et al. | |

FOREIGN PATENT DOCUMENTS

EP     0 689 898 A2     1/1996

OTHER PUBLICATIONS

European Search Report mailed May 10, 2010.

*Primary Examiner* — John C Hong
(74) *Attorney, Agent, or Firm* — Crowell & Moring LLP

(57) ABSTRACT

A cast iron brake caliper with improved fatigue life, and a process and process equipment for pre-stressing a cast iron brake caliper to provide improved fatigue life, is provided. In the process, a load is applied to a cast iron caliper, where the load is high enough to locally yield and plastically deform the cast iron material, but not high enough to cause material failure, such as cracking. Upon load removal, residual compressive stresses in the cast iron caliper lower the mid-point of the stress range the plastically-deformed region of the caliper sees during in-service use, and thereby lowers the peak stress seen in this region, increasing fatigue life. The process permits a cast iron brake caliper to be designed to use less material and thus fit within constrained wheel rim envelopes, without the need to resort to high cost materials or other alternative design strategies.

22 Claims, 11 Drawing Sheets

$$S_m = S_{mean} = (S_{max} + S_{min})/2$$
$$S_r = S_{range} = (S_{max} - S_{min})$$
$$S_a = S_{alternating} = (S_{max} - S_{min})/2$$

Elastic Loading without Pre-Stress "A"

Pre-Stressing Load "B"

AIR DISK BRAKE CALIPER PRE-STRESSING METHOD AND PRE-STRESSED CALIPER APPARATUS

BACKGROUND OF THE INVENTION

The present invention relates to brakes used on, for example, commercial truck or trailer axles, and in particular to manufacture of brake calipers used in such brakes.

Air disk brakes have been widely adopted in Europe, primarily as result of their performance advantages over conventional drum brakes. These high performance brakes have not been widely adopted in U.S. commercial vehicles. One impediment to wide-scale adoption of disk brakes in the U.S. is the relatively small wheel rims used on U.S. commercial vehicles, as compared those used in Europe, and U.S. vehicle operators' general reluctance to incur the expense of shifting to larger wheel rims, at least in the absence of a regulatory requirement to do so.

The Society of Automotive Engineers is leading work to establish a standard commercial vehicle brake packaging recommendation for industry-wide use, however, this effort has been ongoing for at least eight years without issuance of a formal standard or recommendation, and none is expected to be adopted as a regulatory requirement in the near future (the issuance of a government requirement being seen as a necessity to get commercial vehicle owners to move away from the current standard U.S. wheels). Accordingly, in view of the practical realities of the current commercial vehicle wheel and brake environment, if air disk brakes are to used on a large scale in the U.S. in the near future, air disk brake designs such as those used in Europe must be redesigned to fit within the limited clearance envelope of the existing standard U.S. wheel rim sizes.

Various approaches have been considered for such redesigns, such as using materials other than the usual cast iron, using a smaller diameter brake rotor, and designing the calipers to be thinner in the radial direction to fit within a wheel rim. The common theme among the alternatives is attempting to decrease the radial height of the brake caliper, typically by removing material from the portion of the caliper which bridges over the outer radius of the brake rotor (i.e., the portion of the caliper between the brake application side and the reaction side of the caliper). None of these solutions has yet to provide a design without undesirable compromises, such as prohibitive cost (due to, for example, the use of higher strength, higher cost materials) or insufficient strength and/or fatigue life due to unacceptably thin caliper sections.

Engineering calculations and testing have shown that when a brake caliper is loaded during brake application, there are regions of very high stress in and near the areas of the brake caliper which reach over the outer radius of the brake disk. Calculations have demonstrated that when the amount of cast iron in the cross-disk region of a brake caliper is reduced in order to obtain sufficient wheel rim envelope clearance, the stress levels in cast iron brake calipers manufactured using conventional manufacturing methods are so high as to significantly reduce the fatigue life of the caliper, to the point that adequate caliper life cannot be assured.

Typical approaches to increase fatigue life include increasing the amount of material present in the highly-stressed region; modifying the geometry of the component to further distribute and reduce stresses; moving to higher cost, higher strength materials such as steel alloys, and various surface treatments.

U.S. Pat. No. 5,841,033 shows a method of improving fatigue performance in steel components (a much more ductile material than cast iron, which is brittle and unforgiving of excessive deflection). In this method, a compressive force is applied to specific points along the surface of the components to pre-stress the component in localized areas. This pre-stress is not applied over the entire surface of the components, or to inner regions.

U.S. Pat. No. 4,248,191 shows a pre-stressing method for use in minimizing the potential for cracks in engine cylinder heads. In this method, rings are added in a region between valve seats in the cylinder head. These additional rings are intended to apply compressive forces in the between-seat region, and thereby prevent the occurrence of tensile stresses in the cast iron cylinder head (i.e., if tensile forces are applied to the cylinder head, the pre-stressing ring's compressive forces are intended to be so high that the applied tensile forces never overcome the compressive forces of the rings).

U.S. Pat. No. 5,193,375 shows a method to increase the life of a cast iron brake drum by shot-peening the surface of the brake drum to relieve residual stresses in the surface of the brake drum.

U.S. Patent Application No. US 2008/0081208 shows an element with a textured surface (i.e., a stamp) which is used to apply a surface pre-stress to a component made of ductile materials such as a stainless nickel-based alloy.

International Patent Publication WO 2004/078275 shows an aluminum or steel golf club head with a pre-determined pre-stress applied to the surface of the club head's striking face, so as to obtain a spring-like effect.

None of these references, however, teaches an approach to improving fatigue life which is applicable to preventing failure of a brake caliper, for example by generation of fatigue cracks, where the highest-stressed material in the caliper is not necessarily located at the surface of the caliper. Moreover, none of the references teach any approach which is compatible with cast iron brake calipers (the foregoing cast iron cylinder head reinforcing ring approach not being relevant to a cast iron brake caliper, as there is no room for the addition of a reinforcing ring in the most highly stressed regions of a brake caliper).

SUMMARY OF THE INVENTION

The present invention provides a cast iron brake caliper with improved fatigue life, and a process and process equipment for pre-stressing a cast iron brake caliper to provide improved fatigue life.

It is known generally that the fatigue life of ductile materials may be increased by shifting the range of operating stress on the material into a region with lower peak stresses. FIG. 1 provides a example illustration of this effect in a modified Goodman diagram. This diagram shows the relationship between mean stress magnitude, stress range amplitude and the number of cycles to fatigue failure for an example material. A first loading example A is repetitively loaded between a minimum stress level $S_{min}$ (in this example, zero stress) and a maximum stress level $S_{max}$. The midrange stress associated with this stress range $S_r$ ($S_r$ being the difference between $S_{max}$ and $S_{min}$) is used to locate a plot of the example A stress range on the ordinate axis. In this example, plotting the example A stress range at its corresponding midrange stress places the example A minimum stress level on a line corresponding to a fatigue life of $10^4$ cycles.

A second loading example B shows the benefit of pre-stressing a component with compressive stress. In this example, the magnitude of the stress range Sr is the same as in example A. However, the application of compressive pre-stressing to the material has effectively shifted the stress range toward the compression region, resulting in a lower midrange stress between the extremes of $S_{max}$ and $S_{min}$. Accordingly, when the example B is plotted on the modified Goodman diagram at the lower midrange stress, the example B $S_{min}$ value intersects the fatigue life cycles lines at a fatigue life of $10^6$ cycles. This is a substantial increase in fatigue life over the example A design, even though the example B material must endure loading over the same large stress range as in example A.

FIGS. 2a, 2b and 2c provide an example illustration of the stress distribution in an object of simple geometry, to further illustrate the effects of pre-stressing. FIG. 2a illustrates a block 10 at three successive times being loaded and unloaded in the elastic range. Initially the force applied at the center 20 of the left side of the block 10 is at zero, and the corresponding stress across the thickness of the block 10 at line A-A, shown below the block 10, is zero. As a later time, a force A in the elastic range is applied, and the force A is resisted by two opposing points 30 on the right side of the block 10, resulting the block 10 being placed in bending. Thus, at point 20 the block 10 is in compression as shown in the stress line below the block. Due to the bending load, the stress increases linearly to a tension state on the right side of the block 10. Finally, after the force A (which is still within the elastic range of the material) is removed, the stress across the cross-section of the block at line A-A returns to zero throughout the block 10.

FIG. 2b illustrates the effect on block 10 from application of a force high enough to pre-stress the block material. In the first illustration in FIG. 2b, the block 10 is at zero stress across its cross-section at line A-A, as was the case in FIG. 2a. However, in this case a force B is now applied, where the force B is higher than the elastic range force A, such that force B causes plastic elongation of the block material at the right side of block 10, as indicated in the stress line below the block. The plastic elongation, i.e., a lateral shift of the material response curve on a stress-strain diagram (a well-known phenomena which occurs at strains on the order of a few percent elongation in materials such as cast iron), is frequently manifested in the form of highly localized plastic deformation, but may also occur in a distributed manner, for example, at a plurality of local points of stress concentration.

As with FIG. 2a, at the left side of the cross-section A-A the material is in compression and the stress increases into the tensile range toward the right side of the block 10. However, because the force B was high enough to plastically deform a portion of the block 10 (but not so high as to exceed the material's ultimate stress), the stress distribution becomes non-linear once the yield stress is reached within the block material, and increases at a lower rate in the plastically-deformed region at the right side of block 10. Then, once the force B is removed and the applied force again becomes zero, the material which is only elastically deformed (i.e., the material surrounding the plastically deformed region) attempts to return to its original shape. As a result, the return-to-original-position-seeking elastically deformed material applies a compressive pressure to the plastically deformed material. This effect is illustrated in the A-A cross-section stress distribution, which is no longer linear, but instead illustrates that the material at the right side of the block 10 is under a compressive residual stress.

The benefit of the compressive residual stress realized in the FIG. 2b loading is shown in FIG. 2c. In this figure, the pre-stressed block 10 initially has the residual stress distribution generated when the force B was removed from the block 10 in FIG. 2b. When a force in the elastic range is now applied to block 10, the stress at the left side of block at cross-section A-A is a compressive stress, as before. However, rather than the stress increasing linearly across the block as in the FIG. 2a non-pre-stressed block, the stress from the applied force is summed with the residual stress distribution across the block 10. As a result, there is a new reduction of the stress level at the right side of the block 10. After the elastic range force is removed, the residual stress distribution returns to the pre-stressed distribution. Thus, while pre-stressing of the block 10 does not result in reduction of the magnitude of the range of stress experienced at any given point within block 10, pre-stressing does result in a decrease in the maximum stress experienced by the block, which in turn increases the number of cycles the block 10 may undergo before fatigue failure.

While pre-stressing of ductile materials is known, it has previously been believed that pre-stressing was not a viable option for cast iron brake calipers, in part because cast iron has only a fraction of the ductility of materials such as steels, and in part because the most highly stressed portions of commercial vehicle brake calipers are typically within the interior of the caliper structure, where conventional surface deformation approaches to pre-stressing cannot be applied and/or do not have any significant effect. In particular, cast iron's lack of ductility is a problem because cast iron typically cannot endure significant deformation under tension before cracks form as plastic elongation limits are exceeded.

The present invention provides a solution to these and other problems of the prior art, by providing a cast iron brake caliper which is compact enough to fit within the wheel rim envelope of U.S. wheel rims, while also having significantly improved fatigue life. The present invention also provides a corresponding process for creating the caliper by applying loads in a highly controlled manner to alter the internal structure of the material of the caliper. The invention further meets the objective of providing a caliper-altering process which is both cost-effective and simple for relatively unskilled labor and/or robotics to perform in a production environment.

In one embodiment, a cast iron brake caliper is designed with a thinner than customary section which bridges the gap over a brake rotor between the brake actuator and reaction sides of the caliper. In the pre-stressing process of the present invention, the cast iron caliper is then subjected to a pre-stressing loading in a highly controlled manner to alter the caliper's material structure in the most highly stressed region(s) of the caliper. Preferably, the load is applied to the caliper in the same manner as during brake use in an installed vehicle brake application, e.g., the portions of the caliper which are alongside a brake rotor during brake application are pushed apart in the same manner was when reaction forces are generated during brake application. Once the load is increased to a predetermined level, the load is maintained for a predetermined period, and then the load is decreased in a controlled manner. The pre-stressing loading cycle may be repeated one or more times.

The load applied in the inventive pre-stressing process is set high enough to cause elastic deformation in the majority of the brake caliper, and further high enough to also cause a very limited amount of plastic deformation to occur in the very highest-stressed regions of the caliper (i.e., exceeding the yield limit in these highest-stressed regions, resulting in plastic elongation of the caliper material). The load must be set high enough to cause the desired plastic elongation, but must also be controlled so that the load is neither too high nor applied for too long a period that the brake caliper structure begins to fail, for example by exceeding the plastic elongation limit (i.e., the ultimate strength, which is the point at which plastic elongation ceases and failure of the material begins)—a point which frequently (but not always) is accompanied by the development of cracks in the material.

When the most highly-stressed portion of the brake caliper plastically deforms, the cast iron material in the deformed portion area is effectively "stretched." Then, as the load is removed, the elastically-deformed cast iron material surrounding the plastically-deformed material begins to return to its original shape. As the material which has been only elastically-deformed contracts back to its original shape, it applies compressive force to the "stretched" plastically-deformed portion. Once the pre-stressing load is completely removed, the stress in the brake caliper returns to zero, except in the plastically-deformed region, which is now (in the unloaded state) pre-stressed with a compressing stress from the surrounding material.

The development of compressive forces around the plastically deformed portion of the cast iron brake caliper effectively shifts the load range $S_r$ of the plastically-deformed portion of the caliper to a lower midrange stress on a Goodman diagram, similar to the shift in the FIG. 1 diagram from example A to example B. Thus, as a result of the inventive pre-stressing process, the most highly-stressed portion of the cast iron brake caliper sees lower peak stresses and lower midrange stresses, and the fatigue life of the caliper is increased, in some instances by two or more orders of magnitude. Moreover, because this process does not rely on surface treatments, it is capable of compressive pre-stressing of material wherever the region(s) of highest stress may be located, including within the internal structure of the cast iron brake caliper.

The inventive cast iron brake caliper pre-stressing process thus avoids the compromise solutions of the prior art. For example, there is no need for the use of costly higher strength materials to provide the required fatigue service life (and the associated increases in manufacturing costs and material processing difficulty associated with the use of such materials, such as more expensive tooling required to deal with the higher strength material), nor is there any need to use smaller brake rotors, thereby reducing the thermal capacity, braking force and pad and rotor life performance of the disc brake.

The inventive pre-stressing process also provides additional benefits, including reducing the effect of stress risers, as well as reducing the effects of sand casting defects on the strength of the caliper (those of ordinary skill in the art will recognize casting defects to be frequently occurring in series production sand casting, and that by causing the material surrounding such defects to apply compressive forces to the defects, the load range experienced by the defects is shifted downward, effectively reducing the effect of the defects on fatigue life). Accordingly, the present invention provides U.S. commercial vehicle operators with disk brakes which fit within the highly constrained U.S. wheel rim envelope, yet are still light in weight, low in cost and have an improved service life.

Other objects, advantages and novel features of the present invention will become apparent from the following detailed description of the invention when considered in conjunction with the accompanying drawings.

DETAILED DESCRIPTION OF THE DRAWINGS

Figure 1:
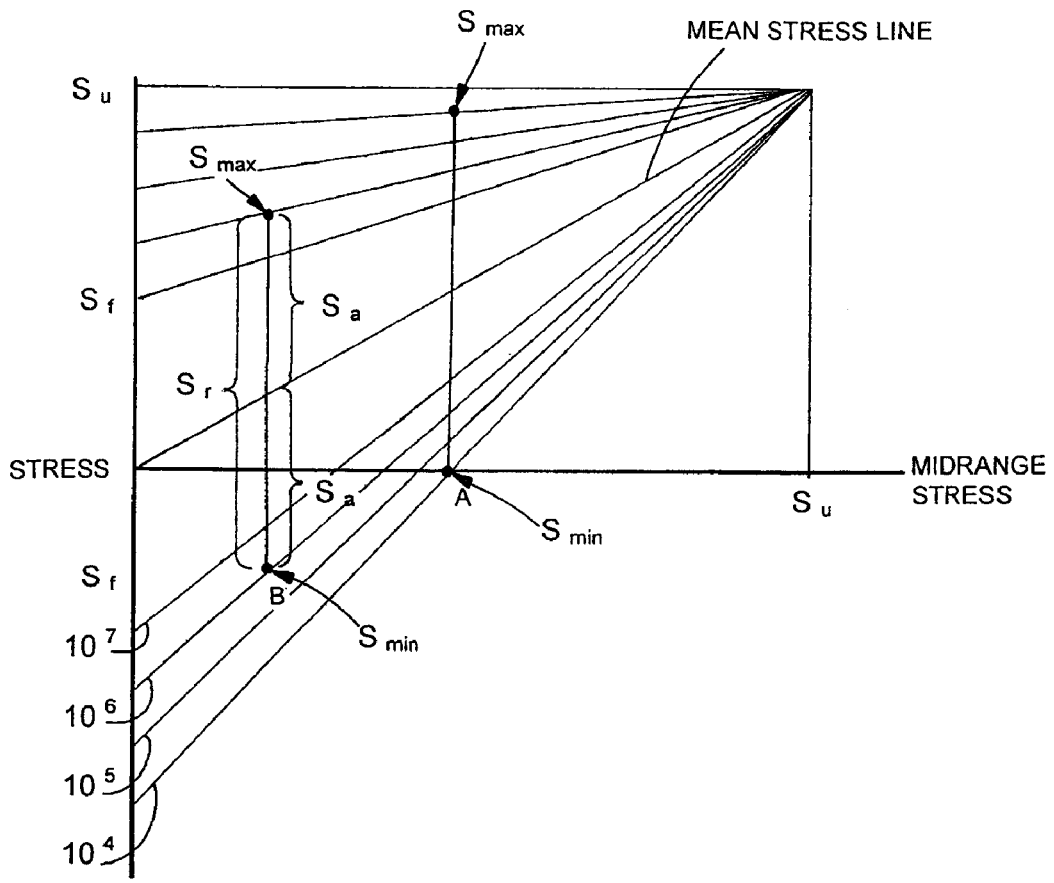
FIG. 1 is a modified Goodman diagram, illustrating the effect of shifting of a load range and midrange stress on the fatigue life of a material.
Figure 2A:
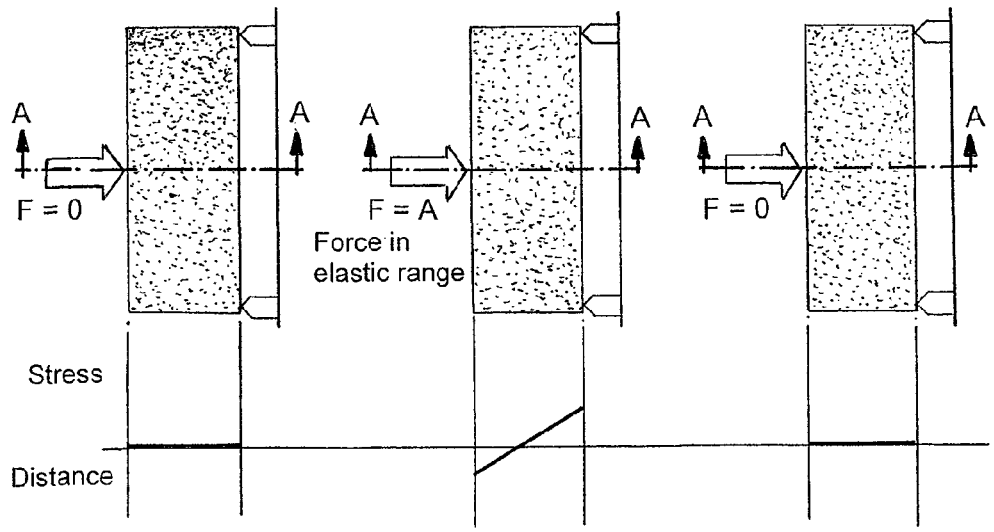
FIGS. 2a, 2b and 2c illustrate the effects of pre-stressing on stress distribution in a geometrically simple object.
Figure 2B:
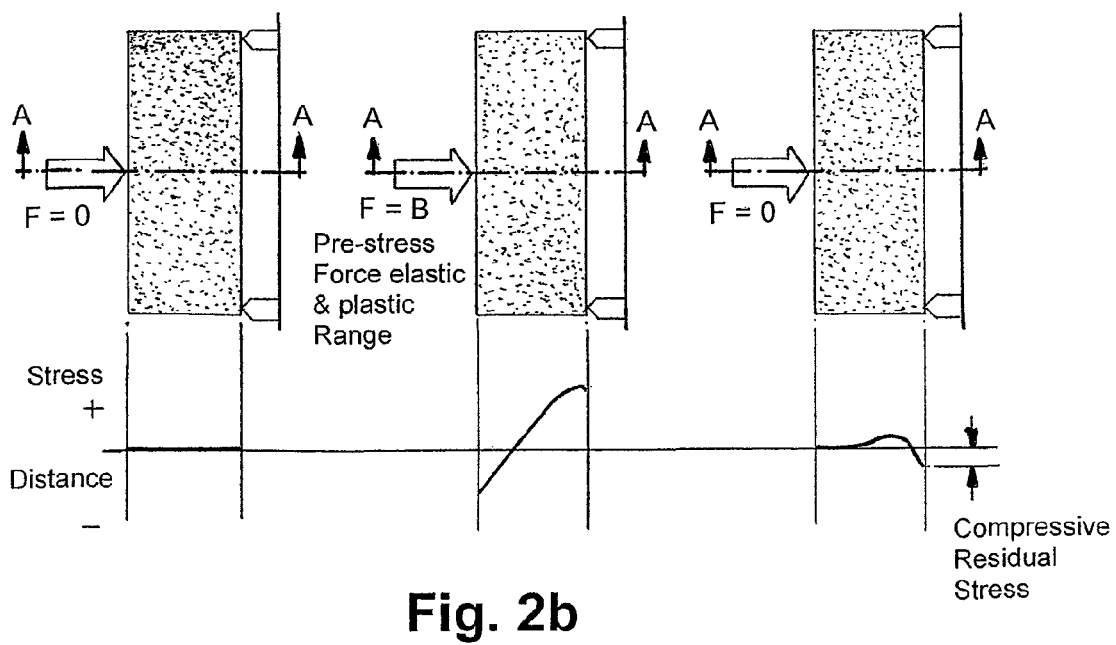
Figure 2C:
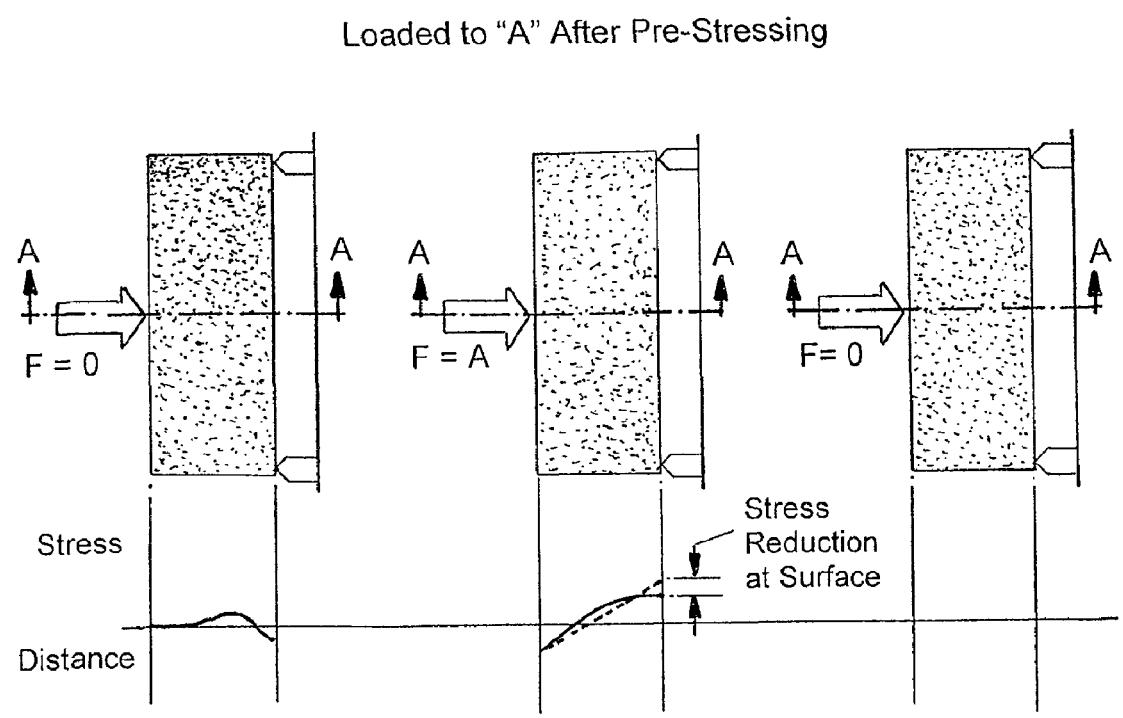
Figure 3A:
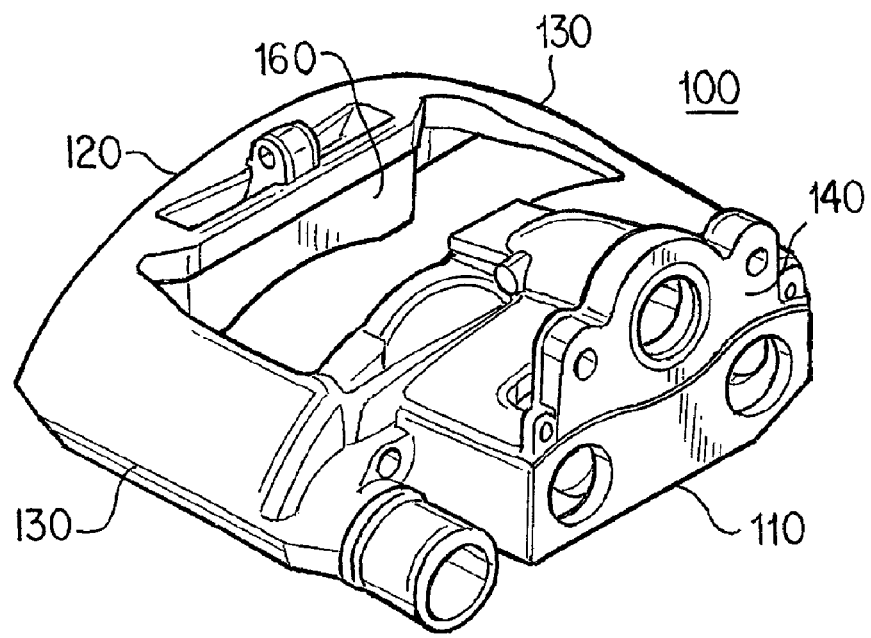
FIGS. 3a, 3b and 3c illustrate a brake caliper in accordance with an embodiment of the present invention and loads applied during brake application.
Figure 3B:
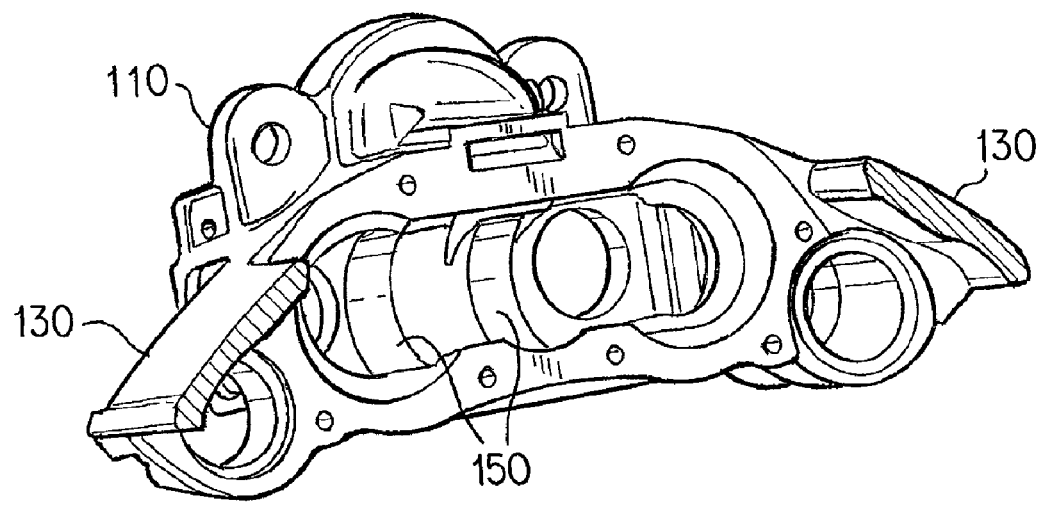
Figure 3C:
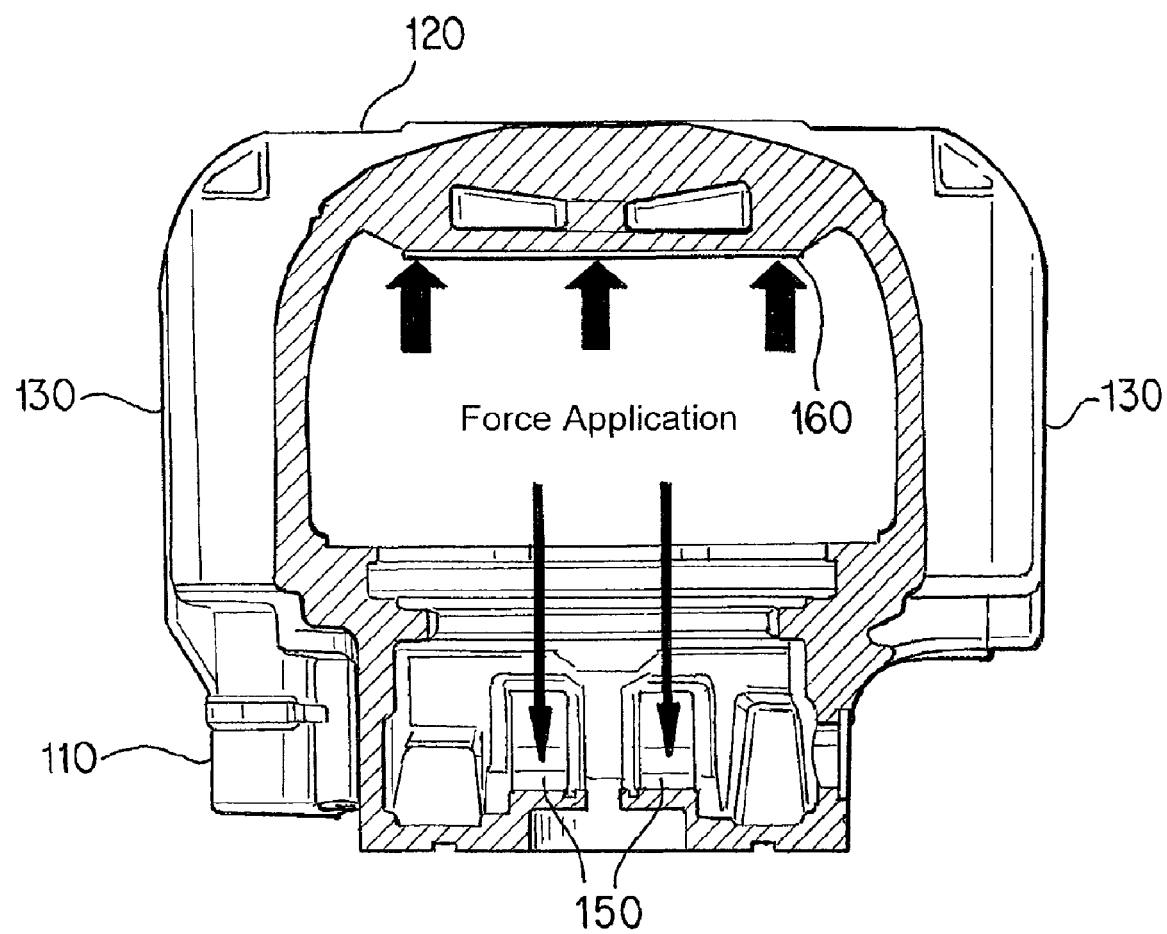

FIGS. 3a, 3b and 3c show an embodiment of a brake caliper 100 to which a pre-stressing process is to be applied. Because the basic design and operation of such calipers is well known to those of ordinary skill in the art, the majority of the components of a disk brake have been omitted from the figures for clarity.

FIG. 3a is an oblique view from above of caliper 100, which includes brake actuator side 110, reaction force side 120, and rotor bridging portions 130 which join the brake actuator side 110 and reaction side 120 over the outer radius of a brake rotor (not illustrated). As can be seen in FIG. 3b, which is a sectioned view of the brake actuator side 110 of the caliper 100 viewed from the reaction side, the bridging portions 130 directly over the rotor are among the thinnest portions of the caliper. As a result, these thin sections 130 are among the most highly stressed portions of the caliper when a brake application force is applied.

In this caliper embodiment, braking force is applied by a brake actuator (not illustrated) attached the rear face 140 of the brake actuator side 110 of the caliper 100. The actuator applies brake application force to a lever (not illustrated) to advance brake pad application pistons (not illustrated) toward the brake rotor. As the lever transfers the braking force to the brake pad application pistons, a reaction force is generated, which is met by lever bearing seats 150 formed in the rearward surface of the brake actuator side of the caliper. The reaction force biases the brake actuator side 110, and thus the entire caliper 100, laterally away from the brake rotor. The reaction force is countered by the reaction side 120 of the caliper 100 when the brake pads on the reaction side of the caliper (not illustrated) come into contact with the brake rotor on their front surfaces and press (via intermediate components) against a pad abutment surface 160 in the reaction side 120 of the caliper.

As shown in FIG. 3c, in this embodiment the generation of reaction forces as a result of brake application results in generating equal and opposite reaction force at lever bearing seats 150 of the brake actuator side 110 and the pad abutment surface 160 of reaction side 120. These equal and opposite reaction forces are carried between the opposing sides of the caliper 100 through bridging portions 130. In addition to the loads applied by the reaction forces, because the brake caliper 100 is asymmetrical and the brake application reaction forces are applied in caliper regions radially well below the bridging portions 130, these thin sections also must endure a high bending loading as the brake actuator side 110 and reaction side 120 attempt to separate by rotating about the ends of the bridging portions 130. As will be evident to one of ordinary skill in the art, due to the tensile reaction force loading and the high bending loads, the bridging portions 130 are the regions of the caliper which typically see the highest loading during brake application.

Figure 4:
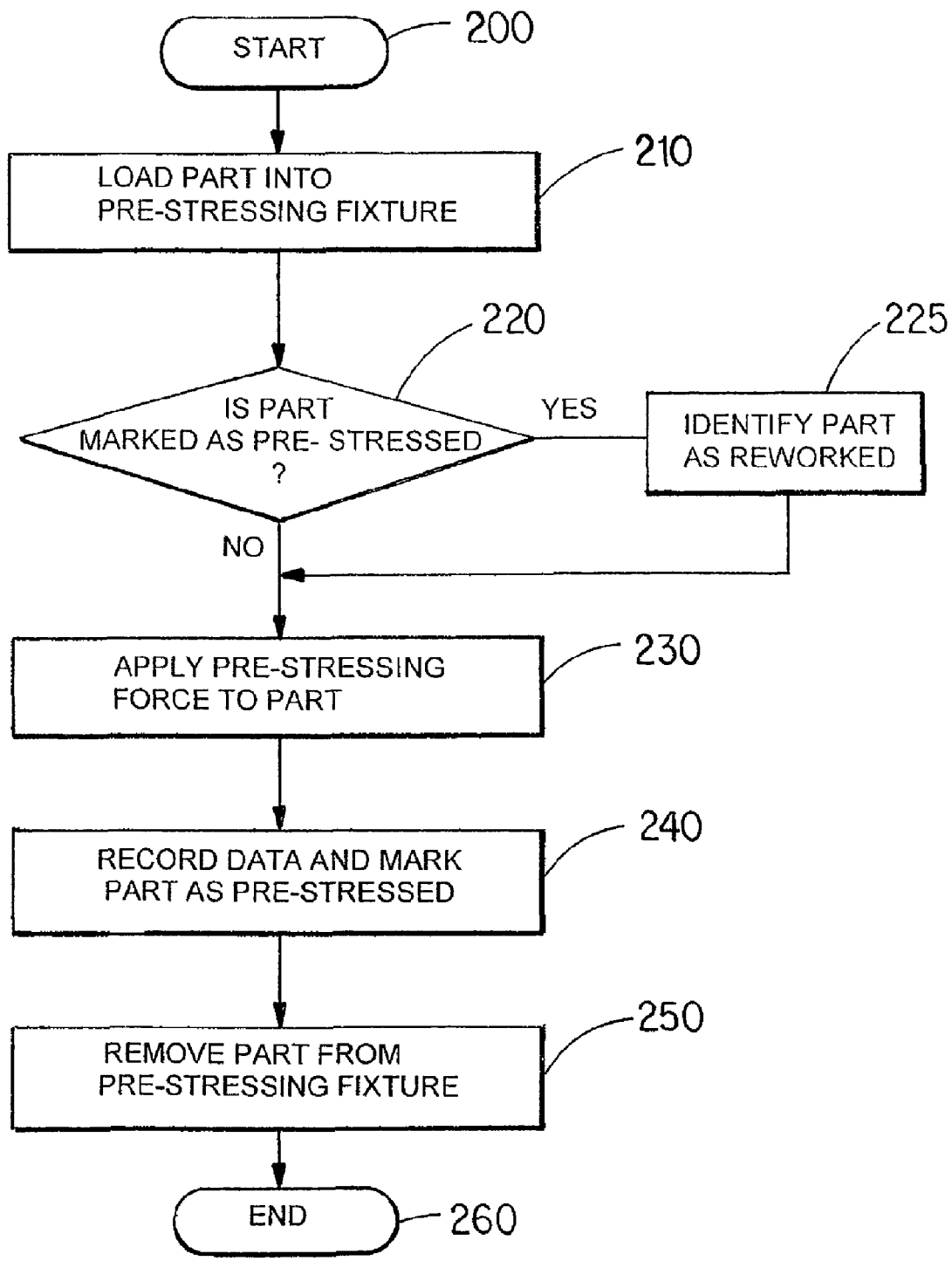
FIG. 4 is a flow chart of a pre-stressing process in accordance with an embodiment of the present invention.

FIG. 4 is a flow chart of a pre-stressing method in accordance with an embodiment of the present invention. The method 200 starts with step 210, at which a part to be pre-stressed, in this case a cast iron brake caliper, is loaded into a pre-stressing fixture (the pre-stressing fixture is described further, below). The caliper may be partially assembled to facilitate the pre-stressing operation. For example, the caliper may have installed load-bearing surfaces such as lever bearing inserts, needle bearings, a lubricated brake actuation lever, and a force transfer component(s) (such as brake application pistons or a simple block) which spans a gap between the lever and the face of a load transfer component which transfers the pre-stressing load from the lever to the reaction side of the caliper.

At step 220 the caliper is identified, for example by a unique serial number read from a bar code or an RFI tag (radio frequency identification tag), and it is determined whether the caliper has been previously subjected to pre-stressing. If the part has been previously pre-stressed, the part is identified as such for subsequent marking and handling as a re-worked part in step 225.

At step 230, the part is subjected to pre-stressing, in a manner discussed further, below. In this embodiment, the pre-stressing force is applied by loading the caliper in a manner similar to actual in-use brake application loading. Specifically, a load application pushrod of the pre-stressing fixture applies the pre-stressing load to the brake actuator lever of the caliper in accordance with a predetermined loading schedule (in this embodiment, a linearly-increasing load, however, loading is not limited to a linear schedule). The pre-stressing load is transferred by the lever to the lever bearing surfaces on the brake actuator side of the caliper, and through the gap-bridging components to the pad abutment surface. During the pre-stressing load application, load, load rate, loading duration and part deflection are monitored to determine whether the pre-stressing process has been properly applied (the monitoring discussed further, below).

Following the application of the pre-stressing load in step 230, in step 240 a part which has been subjected to pre-stressing with all process parameters within specification is identified as a successfully pre-stressed part, appropriate part records are updated, and the part may be marked to indicate that it has been successfully pre-stressed. The data collected may include serial number information for the part, as well as process data such as the maximum and minimum force during the loading cycle (or cycles, if more than one load cycle is practiced), the maximum part deflection during the cycle(s), and the initial and final unloaded part deflection measurements. Upon completion of step 240, the part is removed from the fixture in step 250 for further handling in the production process, and the process reaches its end 260.

Figure 5:
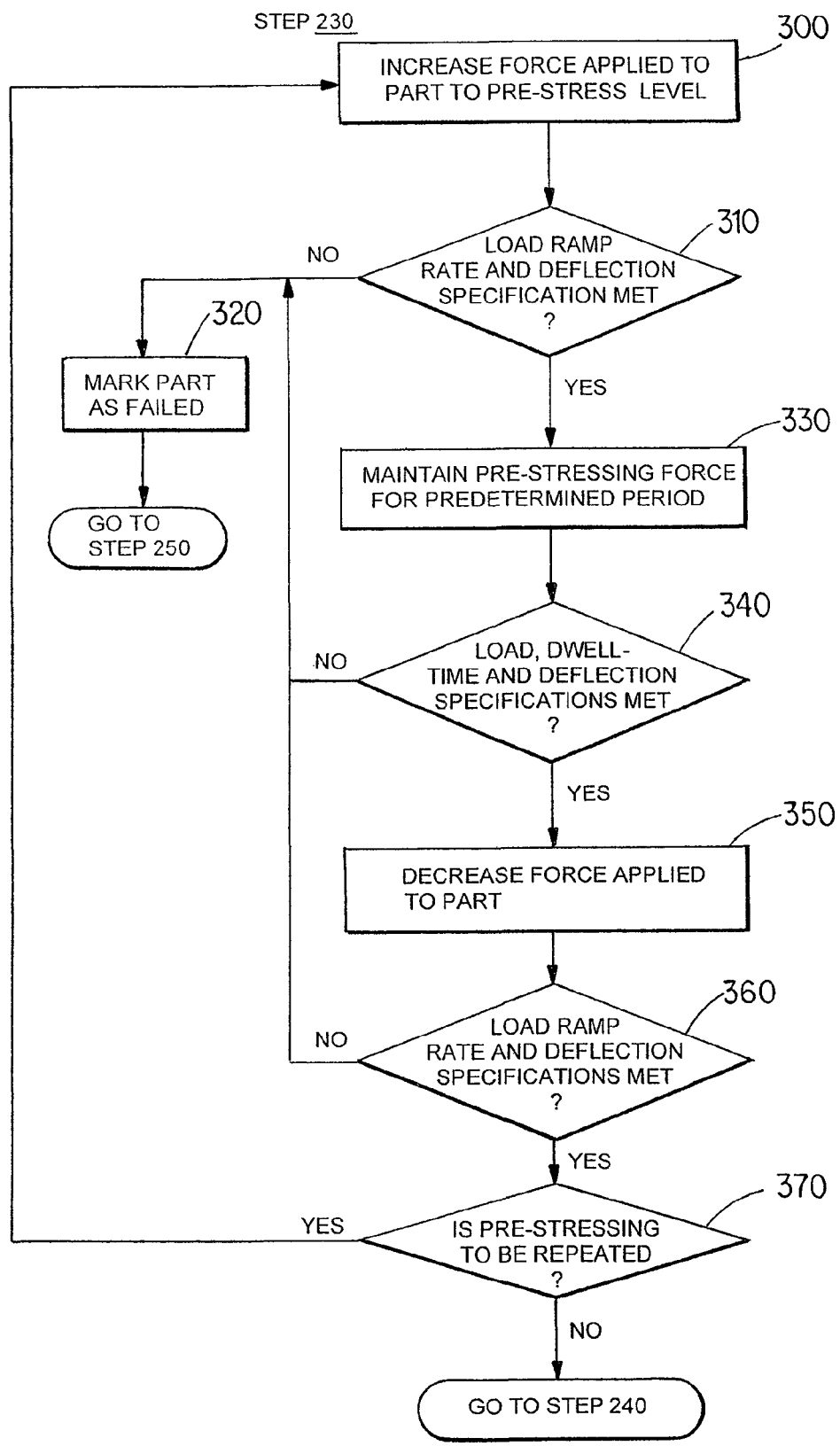
FIG. 5 is a flow chart of actions within one of the pre-stress application steps of FIG. 4.
Figure 6A:
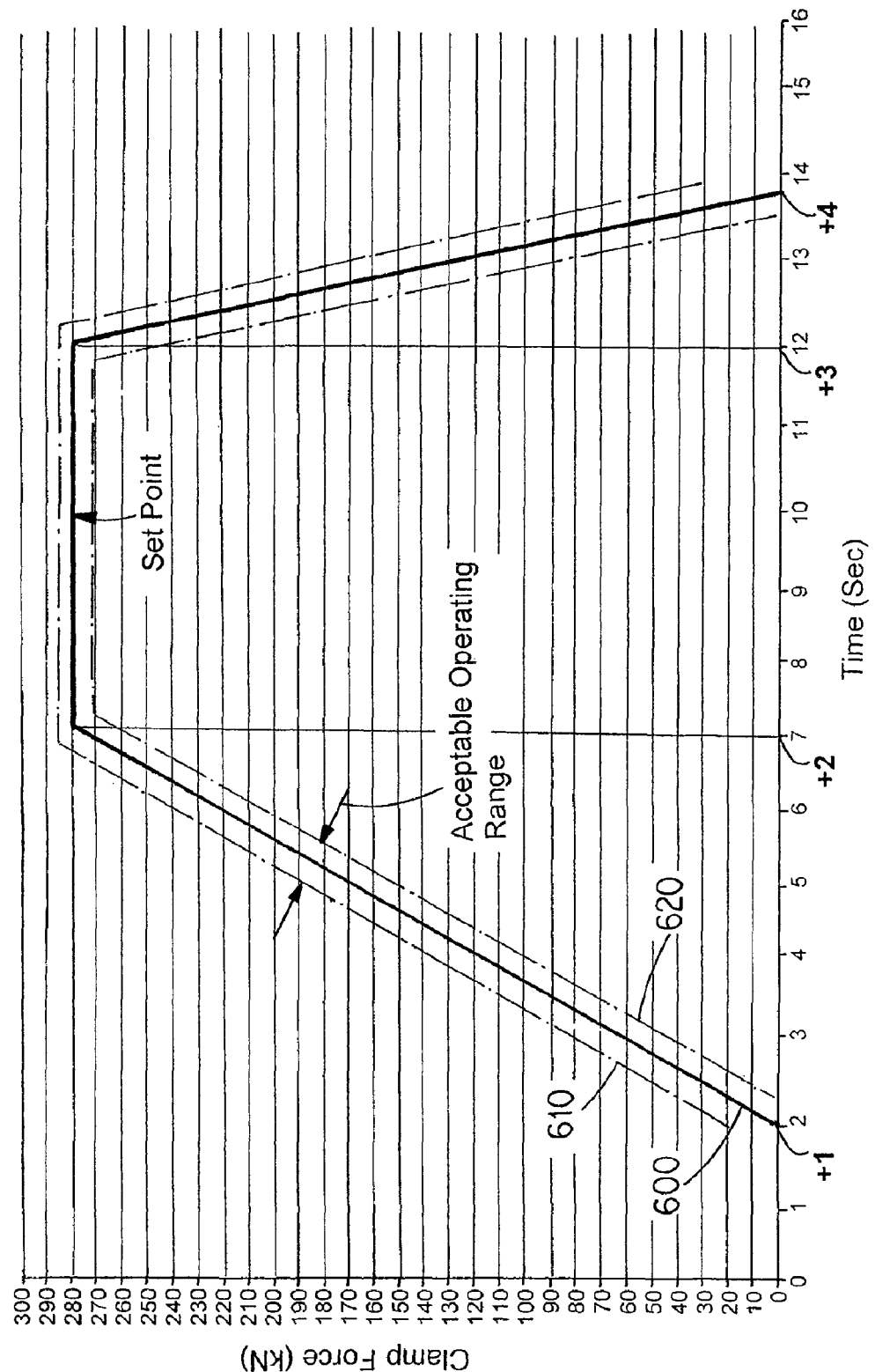
FIGS. 6a and 6b are graphs of pre-stress loading and associated process control limits for a pre-stressing process in accordance with an embodiment of the present invention.
Figure 6B:
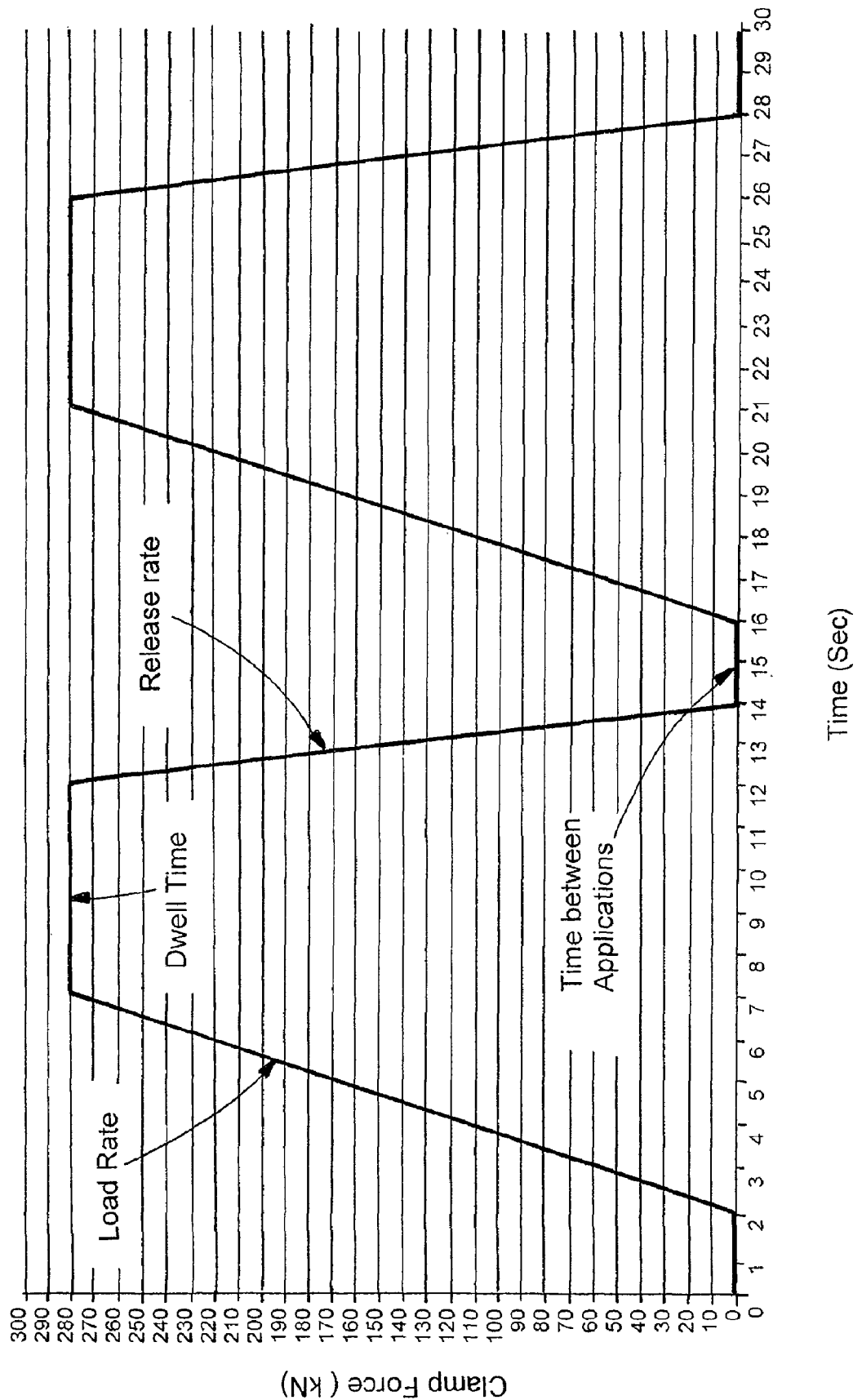

The process of applying the pre-stressing load in step 230 involves a number of actions, illustrated in the flow chart shown in FIG. 5. FIG. 5 will be explained with the aid of FIGS. 6a and 6b, show corresponding graphs of pre-stressing loading and process limits. At the beginning of step 230, in sub-step 300 the load application push rod begins to apply the pre-stressing load. The start of pre-stressing load application is shown in FIG. 6a at time t1. Due to the nature of cast iron, the pre-stressing load 600 must be applied in a very carefully controlled manner, and must be maintained within strict process limits 610, 620. Parameters which may be monitored include the required load, the required rate at which the load is increasing, the required deflection of the part in response to the applied load (an indication of whether the part is behaving in response to the load in the expected manner, or, for example, is deflecting an unexpectedly high amount, indicating the part material has failed).

In the embodiment shown in FIG. 6a, a cast iron brake caliper which is expected to see an in-service load of 170 kN is initially pre-stressed by a load which ramps up from 0 to 255 kN (i.e., above the part's elastic range, but below the failure load) over a period of 5 seconds. One of ordinary skill will recognize that the pre-stressing load must be selected to suit the particular part being pre-stressed, depending on such variables as the cast iron metallurgy of the caliper, and the caliper geometry (including, for example, the thickness and width of the portions between the brake actuator side and reaction side of the caliper). For example, while the above-noted pre-stressing loading can be expected to be appropriate for a large air disk brake caliper, such as the Bendix Spicer Foundation Brake, LLC, Elyria, Ohio, Model ADB22X™ 22" air disk brake caliper, lower pre-stressing loads can be expected to be appropriate for smaller calipers. Thus, the peak pre-stressing load for typical commercial vehicle brake calipers may be expected to vary between approximately 120 kN and 400 kN, depending on the design of the particular caliper to be pre-stressed.

At sub-step 310, it is determined whether all of the process limits were met during the load ramp-up in sub-step 300, including determining whether the load ramp rate and part deflection limits were exceeded. If the process specifications were not met, then the part is marked as failed in sub-step 320.

If the process limits during the loading ramp-up were determined to have been met in sub-step 310, then in sub-step 330 the pre-stressing loading of 255 kN is maintained for a pre-determined period, in this embodiment 5 seconds. At the end of the load maintaining sub-step 330, time t3, another determination is made in sub-step 340 as to whether all of the process limits were met during the load maintaining sub-step. If the process specifications were not met, then the sub-process process proceeds to sub-step 320 for marking the part as failed.

If the process limits during the load maintaining sub-step were met, then between time t3 and time t4 the pre-stressing load is ramped down to zero in sub-step 350, in this embodiment over a period of 2 seconds. At the end of the load ramping-down sub-step 350 (at time t4), it is again determined in sub-step 360 whether all of the process limits were met during the load ramping-down sub-step. If the process specifications were not met, the part is marked as failed in sub-step 320.

As shown in FIG. 6b, the pre-stressing process of the present invention may include more than one application of a pre-stressing load to the part to achieve the desired alteration of the material structure of the part. As shown in FIG. 6b, the number of repetitions may be as few as two, with a predetermined interval between the loadings (in this embodiment, 2 seconds). Alternatively, more repetitions, such as five loading cycles, may be employed to obtain the desired fatigue life increase. In the event multiple loading cycles are to be performed, the loading step 230 includes sub-step 370, in which it is determined whether the pres-stressing force application is to be repeated. If yes, the process returns to the sub-step 300 loading ramping-up process. If not, the process proceeds to data recording step 240.

It will be readily apparent to one of ordinary skill in the art that the operating parameters described in the above embodiments may be varied as necessary to suit the part to be pre-stressed. For example, to obtain a desired amount of fatigue life increase for a particular application, the operator may vary the rate of loading increase and/or decrease, the duration of the period in which the load is maintained at a constant value, the length of time between loading cycles and/or the maximum pre-stressing load. Further, in addition to varying parameters for pre-stressing of different parts, or parameters may also be varied between different load cycles being applied to the same part. Improvement in fatigue life may be further enhanced by conducting the pre-stressing operation at different temperatures, and/or the application of a post-pre-stressing process heat treatment, for example, heating the pre-stressed cast iron brake caliper to 375° F. for a period of 60 minutes. The length of time the pre-stressing load is maintained may also be set to remain below the amount of time required for the caliper material to exhibit the creep phenomena and exceed the material's minimum % elongation (the creep phenomena being the elongation of a material over time as the material is held in a stressed state).

The foregoing pre-stressing processing embodiment may be conducted on a fixture which employs closed-loop process feedback control of the applied pre-stressing force. The pre-stressing force may be applied in a variety of ways, for example, by a hydraulic actuator, as shown in the example embodiment of such pre-stressing equipment illustrated in FIG. 7. In this embodiment, the fixture 700 includes a fixture frame 710 which provides support for a hydraulic actuator 720, caliper positioning blocks 730, and force transfer block 740. The force transfer block 740 is supported on posts (here, bolts 745) on the caliper positioning blocks 720 at a predetermined height above the hydraulic actuator 720. The force transfer block 740 is arranged to fill the internal space between the opposing sides of the cast iron brake caliper (as shown in FIG. 8), and may be equipped with a load cell for monitoring and, if desired, controlling the load applied to the caliper during the pre-stressing process via closed loop feedback.

Figure 7:
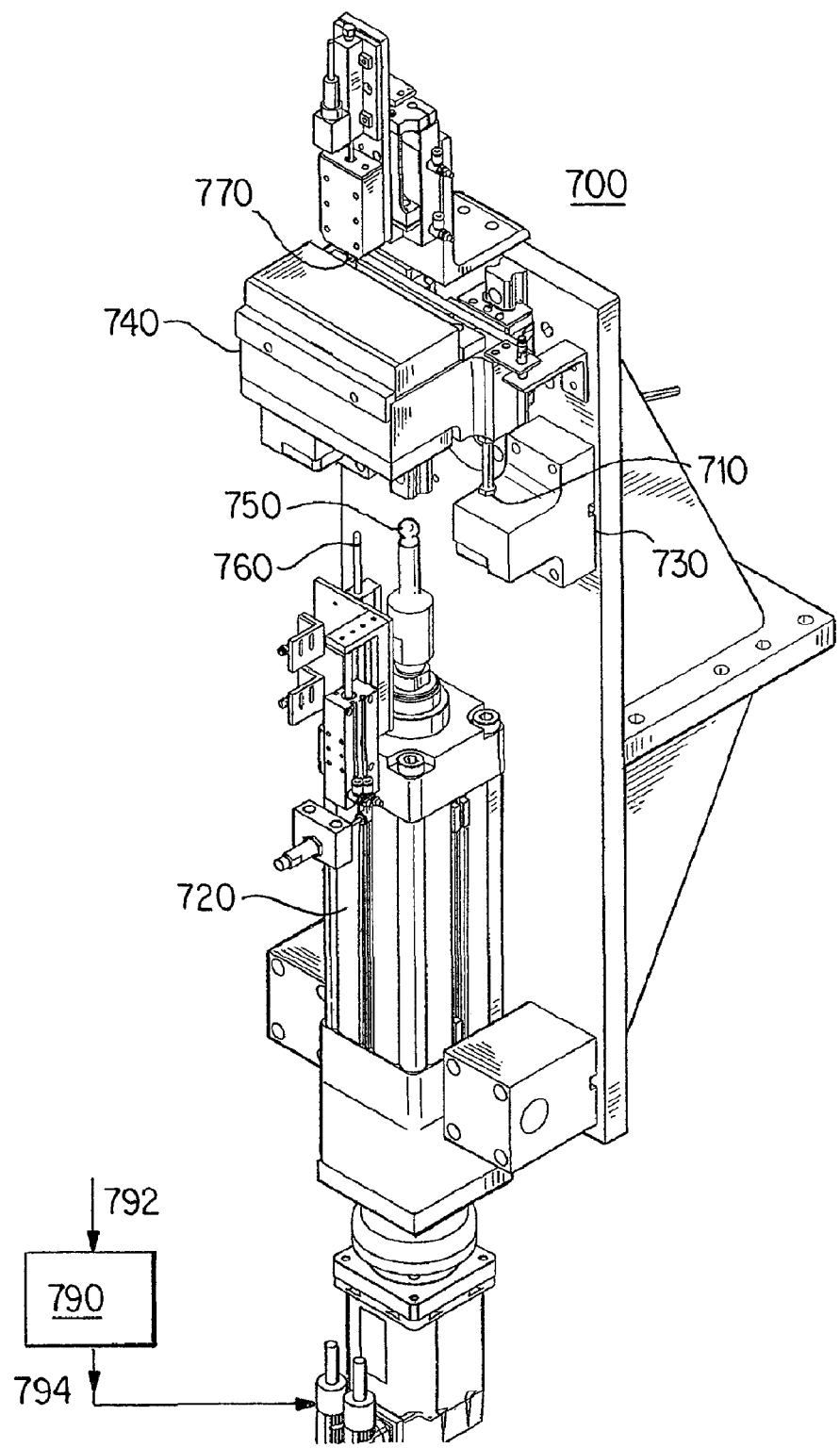
FIG. 7 shows an oblique view of a pre-stressing apparatus for performing cast iron brake caliper pre-stressing in accordance with an embodiment of the present invention.

At the top end of the hydraulic actuator 720, a brake actuator pushrod tip 750 transfers the force generated by the hydraulic actuator to a brake actuation lever within the cast iron brake caliper (not illustrated in FIG. 7 for clarity). The fixture 700 also includes a lower caliper deflection detection probe 760 and an upper caliper deflection probe 770 which may be used to monitor the deflection of the cast iron brake caliper during the pre-stressing process, and further used to provide deflection feedback for closed loop control of the force application during a pre-stressing process.

Figure 8:
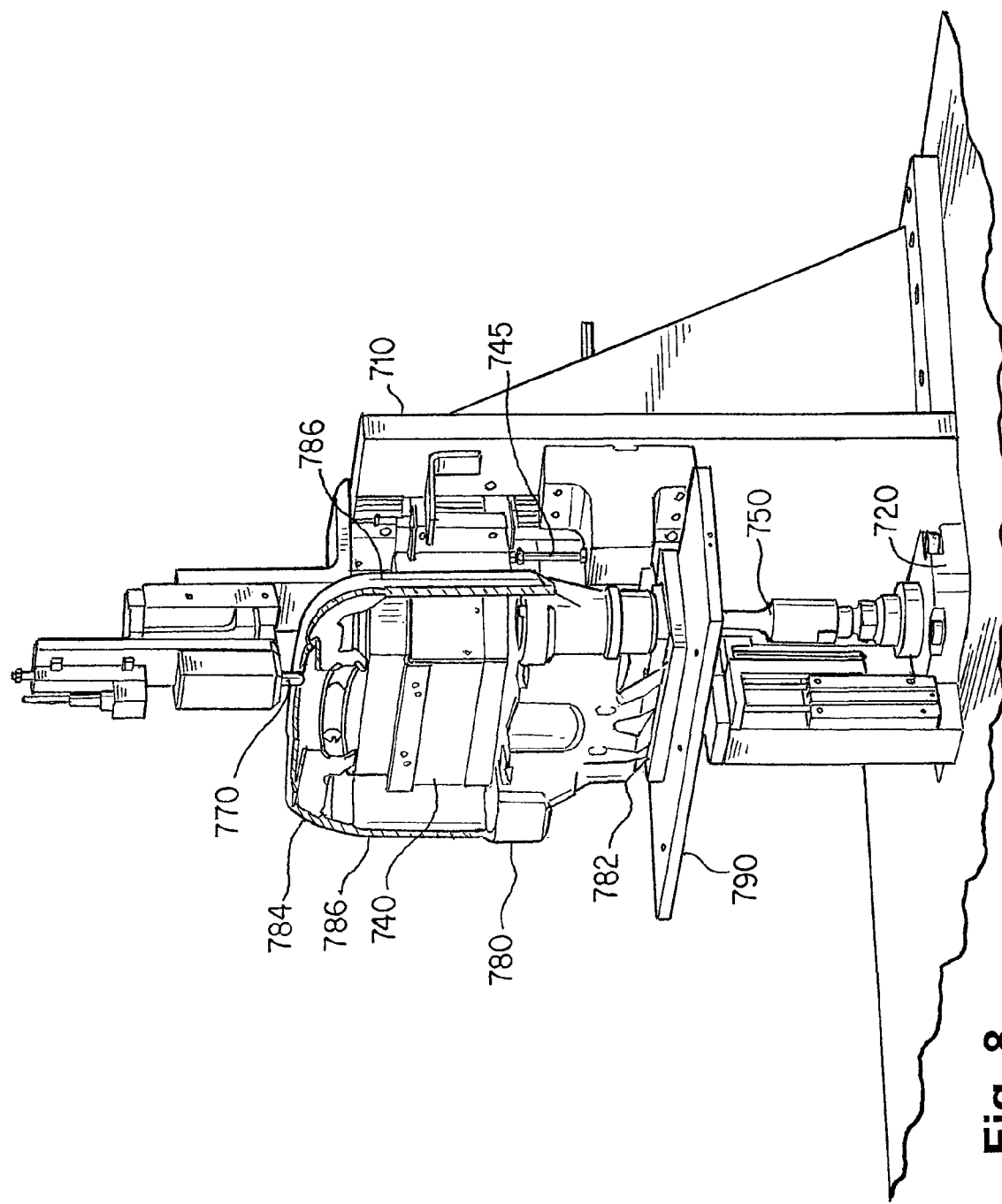
FIG. 8 shows an oblique view of the pre-stressing apparatus of FIG. 7 with a cast iron brake caliper in position for application of pre-stressing in accordance with an embodiment of the present invention.

FIG. 8 shows an oblique view of the pre-stressing apparatus of FIG. 7 with a cast iron brake caliper 780 in position for application of pre-stressing. The brake actuator side 782 of the caliper is supported on a support plate 790 carried by a caliper feeding machine (not illustrated), in this case a robotic equipment handling machine. The brake actuator side 782 is provided with a brake actuator lever (not illustrated within the caliper) located in the conventional manner, and associated force transfer components (also not illustrated within the caliper) which span the distance from the internal rear wall of the brake actuator side 782 of the caliper to the lower face of the force transfer block 740. In a preferred embodiment, these associated force transfer components may be, for example, the caliper's usual in-service brake pad application mechanisms, which have been positioned in a partially-assembled brake caliper.

When the cast iron brake caliper 780 is in position for pre-stressing, the force transfer block 740 fits between the brake actuator side 782 and the reaction side 784 of the caliper, and between the caliper bridge sections 786 connecting the opposing sides of the caliper. When the pre-stressing force (also referred to as the pre-stressing load) is applied by the hydraulic actuator 720 through the brake actuator pushrod tip 750 to the caliper brake lever, the pre-stressing force is applied: (i) by the lever as a reaction force against the internal rear wall of the brake actuator side and as a brake actuation force through the lever's associated force transfer components against the lower face of the force transfer block 740, and (ii) via the top face of the force transfer block 740 to a reaction face of the reaction side 784 of the caliper. The pre-stressing force therefore biases the brake actuator side 782 away from the reaction side 784 during the pre-stressing process in a manner similar to the application of brake application and reaction forces during in-service brake application when a vehicle's brakes are applied.

The pre-stressing process in this embodiment is controlled by a controller 790, schematically illustrated in FIG. 7. The controller 790 receives sensor information via input 792, and outputs via output 794 control signals which control the actuation of hydraulic actuator 720. For example, during the pre-stressing process, lower deflection probe 760 (not shown in FIG. 8) is in contact with the brake actuator side 782, and the upper deflection probe 770 is in contact with the reaction side 784 of the caliper. These sensors permit monitoring of the amount of deflection of the cast iron brake caliper resulting from the applied pre-stressing load. Thus, in addition to controlling the application of the pre-stressing force to the cast iron brake caliper 780 in accordance with a pre-programmed pre-stressing loading schedule (such as the loading schedule shown in FIG. 6a), controller 790 may also apply closed-loop feedback control based on sensor inputs to alter the pre-stressing loading, thereby ensuring that the pre-stressing process remains within its highly controlled limits. For example, the application of the pre-stressing load may be controlled to obtain the caliper deflection to be a desired caliper deflection corresponding to the specified pre-stressing loading schedule. Moreover, the amount of caliper deflection may be monitored such, for example, in the case of the use of the pre-stressing equipment embodiment of FIG. 7 on a Bendix Model ADB22X™ 22" air disk brake caliper, the deflection is controlled to be limited to 2.9 mm, in order to avoid undesired exceeding of the ultimate strength of its cast iron material.

The foregoing disclosure has been set forth merely to illustrate the invention and is not intended to be limiting. For example, the invention is not limited to a one-piece caliper, Rather, pre-stressing may be applied to a multi-part caliper, such as a two-piece caliper built up by bolting together opposing halves of the caliper. Similarly, rather than placing an entire caliper housing in a pre-stressing machine and applying the pre-stressing load to the entire caliper housing, pre-stressing may be applied to individual caliper sub-assemblies or parts which are later assembled into a complete caliper. For example, in the case of a caliper which is built up from separate brake application side, reaction side and rotor-spanning ("arms") parts, the application of pre-stressing only to the highly-stressed rotor-spanning parts prior to these parts' later incorporation into a complete caliper would be within the scope of the present invention. Because such modifications of the disclosed embodiments incorporating the spirit and substance of the invention may occur to persons skilled in the art, the invention should be construed to include everything within the scope of the appended claims and equivalents thereof.

What is claimed is:
1. A method of manufacturing a caliper for a disc brake, the method comprising the acts of:
   forming a caliper housing of cast iron; and
   applying a pre-stressing load to the caliper housing,
     wherein the pre-stressing load is high enough to cause localized plastic deformation in the cast iron brake caliper housing, and below a load high enough to cause failure of the cast iron brake caliper by crack initiation.
2. The method of manufacturing a caliper of claim 1, wherein the caliper is a multi-piece caliper.

3. The method of manufacturing a caliper of claim 1, wherein the pre-stressing load is maintained over a predetermined period sufficient to permit localized plastic deformation to occur.

4. The method of manufacturing a caliper of claim 3, wherein the pre-stressing load is maintained over a predetermined period which does not exceed a length of time associated with reaching a predetermined maximum permissible % elongation as a result of material creep under the pre-stressing load.

5. The method of manufacturing a caliper of claim 4, wherein the pre-stressing load is removed after the pre-determined period has expired.

6. The method of manufacturing a caliper of claim 5, further comprising the act of:
placing the caliper housing into a pre-stressing fixture prior to applying the pre-stressing load.

7. The method of manufacturing a caliper of claim 5, wherein after each of load applying, load maintaining and load removing, the method further comprising the acts of:
determining whether a predetermined process specification is exceeded for at least one of applied load, load ramp-up rate, load duration, load reduction rate and cast iron brake caliper housing deflection amount; and
rejecting a caliper housing if at least one predetermined process specification is exceeded.

8. The method of manufacturing a caliper of claim 7, wherein
during the load applying, the pre-stressing load is applied to the cast iron brake caliper in the same manner as a braking load is applied to the caliper when in service on a vehicle, and the pre-stressing load is increased in a controlled manner in accordance with a predetermined pre-stressing loading schedule, and
during the load removing, the pre-stressing load is decreased in a controlled manner in accordance with a predetermined pre-stressing unloading schedule.

9. The method of manufacturing a caliper of claim 8, wherein
the load applying act is performed more than one time before the cast iron brake caliper housing is removed from the pre-stressing fixture.

10. The method of manufacturing a caliper of claim 8, wherein
the predetermined pre-stressing loading schedule is a linear increase in load from an unloaded condition to a predetermined maximum pre-stressing load, and
the predetermined pre-stressing unloading schedule is a linear decrease in load from the predetermined maximum pre-stressing load to an unloaded condition.

11. The method of manufacturing a caliper of claim 10, wherein the applied pre-stressing load is increased from 0 to between 120 kN and 400 kN.

12. The method of manufacturing a caliper of claim 10, wherein the applied pre-stressing load is increased from 0 to between 250 kN and 300 kN.

13. The method of manufacturing a caliper of claim 10, wherein the applied pre-stressing load is increased from 0 to approximately 255 kN.

14. The method of manufacturing a caliper of claim 10, wherein the applied pre-stressing load is controlled in response to a measured deflection of the caliper housing.

15. The method of manufacturing a caliper of claim 14, wherein the measured deflection of the caliper housing does not exceed 2.9 mm.

16. A method of manufacturing a caliper for a disc brake, the method comprising the acts of:
forming a caliper housing of cast iron; and
applying a pre-stressing load to the caliper housing,
wherein the pre-stressing load is high enough to cause stress levels in the cast iron brake caliper housing high enough to cause plastic elongation in the cast iron, and below a load high enough to cause failure of the cast iron brake caliper by exceeding an ultimate strength of the cast iron.

17. A method for improving fatigue life of a cast iron brake caliper by pre-stressing, the method comprising the acts of:
inserting a housing of the cast iron brake caliper into a pre-stressing fixture;
applying a pre-stressing load to the cast iron brake caliper housing, wherein the pre-stressing load is high enough to cause localized plastic deformation in the cast iron brake caliper housing, and below a load high enough to cause failure of the cast iron brake caliper by crack initiation;
maintaining the pre-stressing load a predetermined period of time sufficient to permit localized plastic deformation to occur;
removing the pre-stressing load; and
removing the cast iron brake caliper housing from the pre-stressing fixture.

18. The cast iron brake caliper pre-stressing method of claim 17, further comprising the act of:
after each of the load applying, load maintaining and load removing, determining whether a predetermined process specification is exceeded for at least one of applied load, load ramp-up rate, load duration, load reduction rate and cast iron brake caliper housing deflection amount.

19. The cast iron brake caliper pre-stressing method of claim 17, wherein
during the load applying, the pre-stressing load is applied to the cast iron brake caliper in the same manner as a braking load is applied to the caliper when in service on a vehicle, and the pre-stressing load is increased in a controlled manner in accordance with a predetermined pre-stressing loading schedule, and
during the load removing, the pre-stressing load is decreased in a controlled manner in accordance with a predetermined pre-stressing unloading schedule.

20. The cast iron brake caliper pre-stressing method of claim 19, wherein
the predetermined pre-stressing loading schedule is a linear increase in load from an unloaded condition to a predetermined maximum pre-stressing load, and
the predetermined pre-stressing unloading schedule is a linear decrease in load from the predetermined maximum pre-stressing load to an unloaded condition.

21. The cast iron brake caliper pre-stressing method of claim 20, wherein
if a predetermined process specification is exceeded during at least one of the load applying, load maintaining and load removing steps, the cast-iron brake caliper is rejected.

22. The cast iron brake caliper pre-stressing method of claim 21, wherein
the load applying, load maintaining and load removing steps are performed more than one time before the cast iron brake caliper is removed from the pre-stressing fixture.

* * * * *